(12) United States Patent
Jiva

(10) Patent No.: US 8,782,622 B2
(45) Date of Patent: Jul. 15, 2014

(54) OPTIMISTIC SELECTION OF BEST PERFORMING GENERATED CODE OF MULTIPLE ISA SYSTEMS

(75) Inventor: Azeem S. Jiva, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1199 days.

(21) Appl. No.: 12/267,089

(22) Filed: Nov. 7, 2008

(65) Prior Publication Data

US 2010/0122242 A1    May 13, 2010

(51) Int. Cl.
*G06F 9/45* (2006.01)
(52) U.S. Cl.
USPC ........................................................ 717/148
(58) Field of Classification Search
USPC ........................................................ 717/148
See application file for complete search history.

(56) References Cited

U.S. PATENT DOCUMENTS 6,308,315 B1 * 10/2001 Dice et al. ..................... 717/106
2009/0144528 A1 * 6/2009 Asai et al. ..................... 712/229

* cited by examiner

*Primary Examiner* — Li B Zhen
*Assistant Examiner* — Bradford Wheaton
(74) *Attorney, Agent, or Firm* — Volpe and Koenig, P.C.

(57) ABSTRACT

A system and method are disclosed for improving the performance of compiled Java code. A native code management module determines the available processor resources associated with a target information processing system, their respective instruction set architecture (ISA), and possible native code compilation optimization processes. The native code management module then generates compiler parameter permutations, which are iteratively provided to a just-in-time (JIT) compiler. Each compiler parameter permutation is used by JIT compiler to generate a native code compilation iteration. Each of the resulting native code compilation iterations are executed by the JVM and their respective performance is measured to determine the best performing native code compilation iteration.

6 Claims, 3 Drawing Sheets

OPTIMISTIC SELECTION OF BEST PERFORMING GENERATED CODE OF MULTIPLE ISA SYSTEMS

BACKGROUND OF THE INVENTION

1. Field of the Invention

Embodiments of the invention relate generally to information processing systems. More specifically, embodiments of the invention provide a system and a method for improving the performance of compiled Java code.

2. Description of the Related Art

Java is an object oriented programming language and environment that has gained wide acceptance in recent years. One aspect of Java is its portability, which has contributed to its popularity with developers of software applications. Java's approach to portability is to compile Java language code into Java bytecode, which is analogous to machine code, but is instead interpreted by a Java virtual machine (JVM) written specifically for the host computing platform. As a result, software applications written in Java can be written once, compiled once, and then run on any combination of hardware and operating system that supports a JVM. However, interpreted programs typically run slower than programs that are compiled into native executables due to the processing overhead associated with interpreting bytecode. One approach to this issue is the implementation of a just-in-time (JIT) compiler that translates Java bytecode into native code the first time the code is executed and then caches the native code in memory. This results in a program that starts and executes faster than pure interpreted code, at the cost of introducing compilation overhead during its initial execution. In addition, JIT compilers are often able to reorder bytecode and recompile for improved performance.

Some JIT compilers are able to optimize the resulting native code to the targeted central processing unit (CPU) and the underlying operating system for the Java application. As an example, a JIT compiler may select Streaming SIMD (Single Instruction, Multiple Data) Extensions 2 (SSE2) CPU instructions when it detects that they are supported by the CPU. Conversely, a static compiler would need to write two versions of the native code, possibly using in-line assembly. In addition, JIT compilers typically collect performance statistics and are able to rearrange the bytecode for recompilation to improve performance.

These approaches are facilitated by Instruction Set Architectures (ISAs) that abstract underlying physical processor architectures into a common instruction set. For example, the AMD Athlon and Intel Pentium implement nearly identical versions of the x86 instruction set, yet their internal designs are significantly different. As a result, while the native code generated for a given ISA may execute properly, it may not be fully optimized for the target processor. Other performance considerations include the JIT compiler's approach to generating native code for an ISA. These may include the implementation of Instruction Based Sampling (IBS), vectorization, and Lightweight Profiling (LWP). Each of these may have attendant affects, negative or positive, on performance. Furthermore, it is now common to use multiple processors in a system, yet the native code generated for the ISA may not fully utilize their respective capabilities or even use them at all. As an example, a system may comprise a multi-processor CPU, dedicated processors for processing graphics or video streams, or even a dedicated Java code processor. In view of the foregoing, there is a need for a holistic approach to determining the best performing native code for a given system and not simply for its associated ISA.

SUMMARY OF THE INVENTION

A system and method are disclosed for improving the performance of compiled Java code. In various embodiments, Java source code is compiled by a Java compiler to produce Java bytecode, which in turn is provided to a Java virtual machine (JVM) for compilation into native code. Java compilation optimization operations are begun by a native code management module first determining the available processor resources associated with a target information processing system. The native code management module then determines the respective instruction set architecture (ISA) associated with each processor resource.

The native code management module then determines possible native code compilation optimization approaches associated with the available processor resources and their associated ISAs. Compiler parameter permutations are then generated by the native code management module from the available processor resources, their associated ISAs, and possible native code compilation optimization approaches. The native code management module then iteratively provides the resulting compiler parameter permutations to a just-in-time (JIT) compiler. Each compiler parameter permutation is used by JIT compiler to generate a native code compilation iteration.

Each of the native code compilation iterations are then executed by the JVM and their respective performance is measured by the native code management module. Once all available compiler parameter permutations have been compiled by the JIT compiler, the native code management module performs comparison operations on the performance measurements to determine the best performing native code compilation iteration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
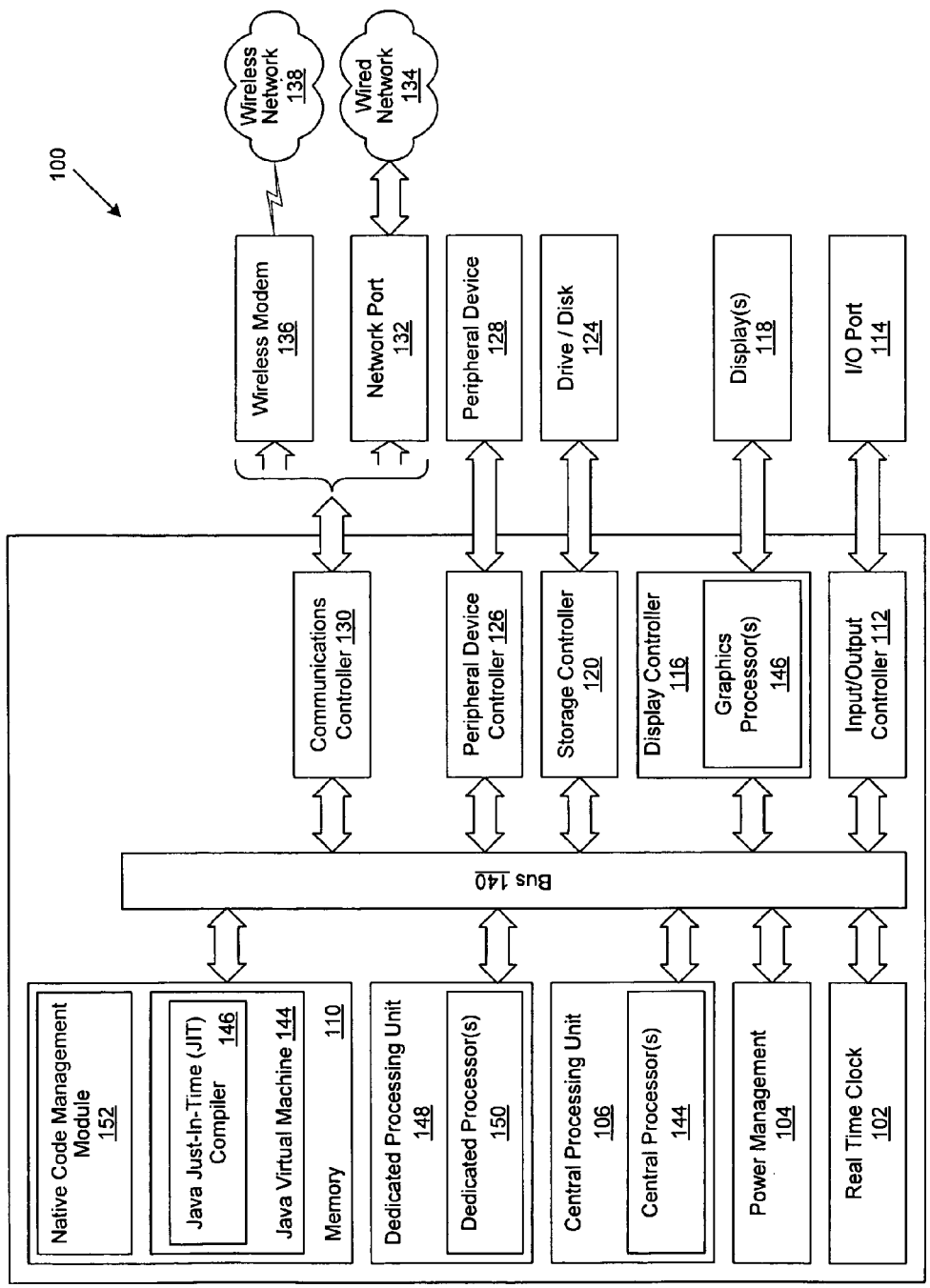
FIG. 1 is a generalized block diagram illustrating an information processing system as implemented in accordance with an embodiment of the invention.

A system and method are disclosed for improving the performance of compiled Java code. FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In various embodiments, the central processing unit 106 comprises at least one central processor 144 and the memory 110 comprises volatile random access memory (RAM), non-volatile read-only memory (ROM), non-volatile flash memory, or any combination thereof. In one embodiment, system 100 comprises a dedicated processing unit 148, further comprising at least one dedicated processor 150. In various embodiments, memory 110 also comprises communications stack 142, Java Virtual Machine 144, and a native code management module 152. In these embodiments, the Java virtual machine 144 further comprises a just-in-time (JIT) compiler 146.

Also physically coupled to bus 140 is an input/out (I/O) controller 112, further coupled to a plurality of I/O ports 114. In various embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In various embodiments, display controller 116 comprises at least one graphic processor 146. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
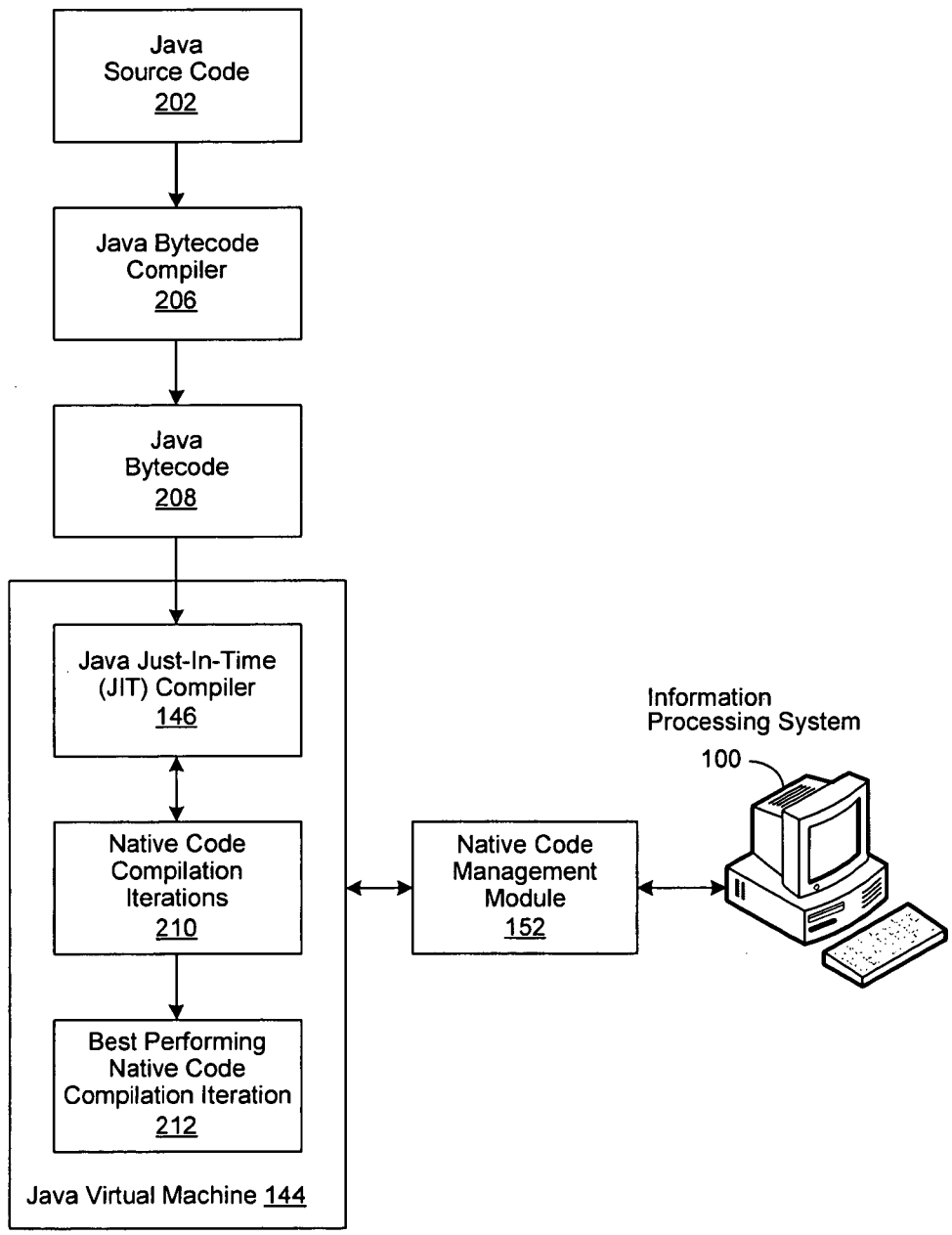
FIG. 2 is a simplified block diagram of a native code management module as implemented in accordance with an embodiment of the invention.

FIG. 2 is a simplified block diagram of a native code management module as implemented in accordance with an embodiment of the invention. In this embodiment, Java source code 202 is compiled by a Java compiler 206 to produce Java bytecode 208, which in turn is provided to a Java virtual machine (JVM) 144 for compilation into native code. Java compilation optimization operations are begun by a native code management module 152 determining the available processor resources associated with a target information processing system (IPS) 100. The native code management module 152 then determines the respective instruction set architecture (ISA) associated with each processor resource. As used herein, an ISA refers to the architecture of an instruction set comprising individual instructions, and their variants, that a processor is operable to execute.

The native code management module 152 then determines possible native code compilation optimization approaches associated with the available processor resources and their associated ISAs. Compiler parameter permutations are then generated by the native code management module 152 from the available processor resources, their associated ISAs, and possible native code compilation optimization approaches. The native code management module 152 then iteratively provides the resulting compiler parameter permutations to the just-in-time (JIT) compiler 146. Each compiler parameter permutation is used by JIT compiler 146 to generate a native code compilation iteration 210. Each of the native code compilation iterations 210 are then executed by the JVM 144 and their respective performance is measured by the native code management module 152. The resulting performance measurements, and their associated native code compilation iteration 210, are then stored in memory by the native code management module 152. Once all available compiler parameter permutations have been compiled by the JIT compiler 146, the native code management module 152 performs comparison operations on the performance measurements stored in memory to determine the best performing native code compilation iteration 212.

Figure 3:
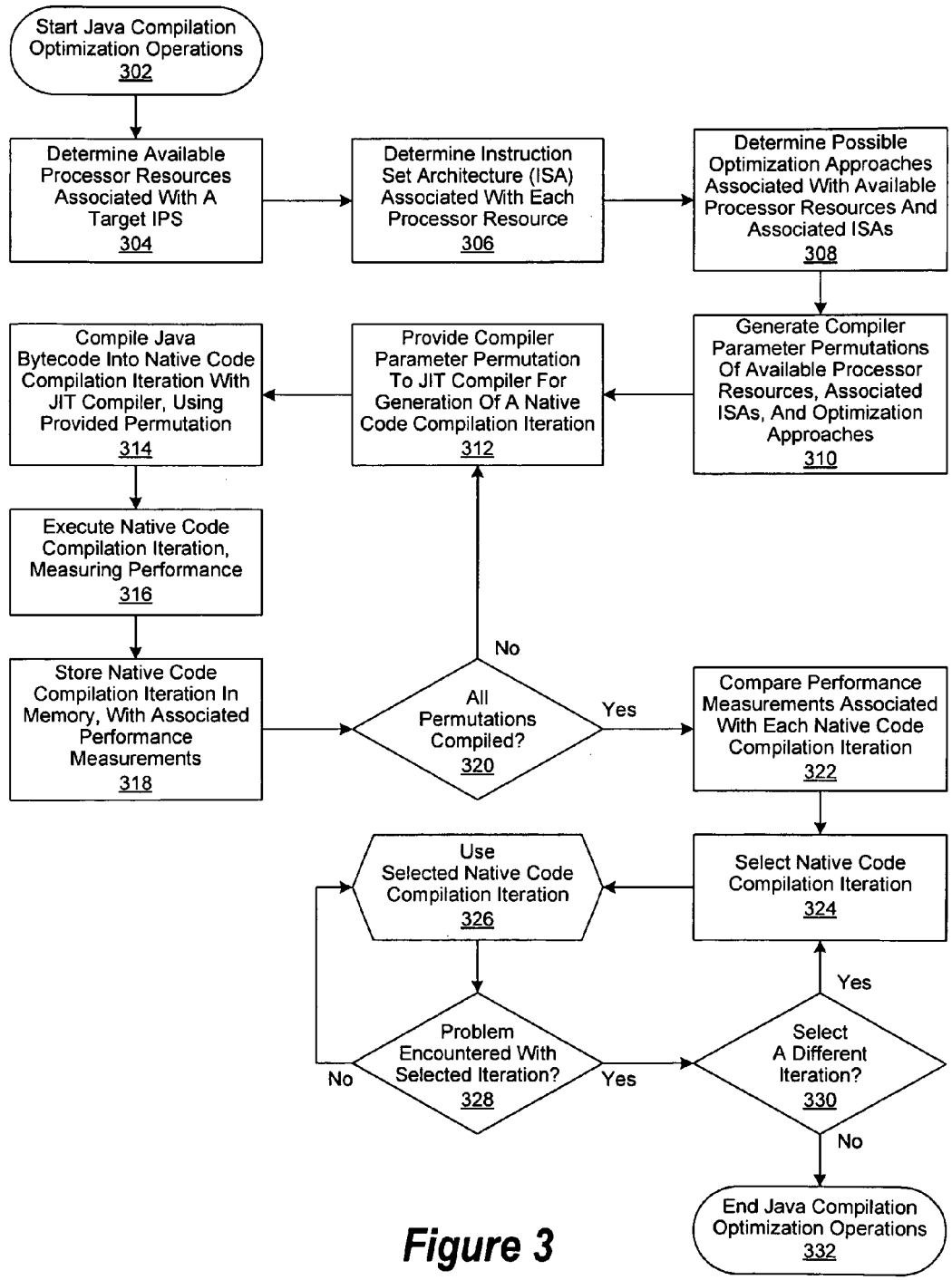
FIG. 3 is a generalized flow chart of the operation of a native code management module as implemented in accordance with an embodiment of the invention.

FIG. 3 is a generalized flow chart of the operation of a native code management module as implemented in accordance with an embodiment of the invention. In this embodiment, the optimization of Java compilation operations is begun in step 302, followed by a native code management module determining the available processor resources associated with a target information processing system (IPS) in step 304. In one embodiment, the available processor resources of the target IPS comprise a central processing unit (CPU) further comprising at least one central processor. For example, the CPU may comprise four central processors in a quad-core configuration. As another example, the target IPS may comprise multiple processor boards, each comprising one or more CPUs, which in turn may comprise one or more central processors. In another embodiment, the available processor resources of the target IPS comprise a graphics processing unit further comprising at least one graphics processor. In yet another embodiment, the available processor resources of the target IPS comprise a dedicated processing unit further comprising at least one dedicated processor. As an example, the target IPS may comprise a processor dedicated to the processing of Java code. Those of skill in the art will realize that the target IPS may be implemented with many such processor resources and the foregoing examples are not intended to limit the scope, spirit or intent of the present invention.

The native code management module then determines the respective instruction set architecture (ISA) associated with each processor resource in step 306. As used herein, an ISA refers to the architecture of an instruction set comprising individual instructions, and their variants, that a processor is operable to execute. Accordingly, an ISA typically comprises the native data types, registers, addressing modes, memory architecture, interrupt and exception handling, and external input/output. Likewise, an ISA comprises a specification of the set of opcodes, or machine language, implemented by a given processor design as native commands. A known advantage of an ISA is that it abstracts underlying physical processor architectures into a common instruction set. For example, the AMD Athlon and Intel Pentium implement nearly identical versions of the x86 instruction set, yet their internal designs are significantly different. As a result, while the native code generated for a given ISA may execute properly, it may not be fully optimized for the target processor.

Then, in step 308, the native code management module determines possible native code compilation optimization approaches associated with the available processor resources and their associated ISAs. In one embodiment, the native code compilation optimization approaches comprise code vectorization operations known to skilled practitioners of the art. In another embodiment, the native code compilation optimization approaches comprise Instruction Based Sampling (IBS) operations likewise known to skilled practitioners of the art. In yet another embodiment, the native code compilation optimization approaches comprise Lightweight Profiling (LWP) operations as likewise known to skilled practitioners of the art.

In step 310, the native code management module generates compiler parameter permutations of the available processor resources, their associated ISAs, and possible native code compilation optimization approaches. As an example, the target IPS may comprise a central processing unit, which supports IBS and LWP, and a graphics processing unit. Accordingly, possible compiler parameter permutations would include:

Permutation 1: CPU
Permutation 2: GPU
Permutation 3: CPU+GPU
Permutation 4: CPU+IBS/LWP In step 312, the native code management module provides a compiler parameter permutation to a just-in-time (JIT) compiler, which then uses the provided compiler parameter permutation in step 314 to generate a native code compilation iteration. The resulting native code compilation iteration is then executed in step 316 and its performance is measured by the native code management module. The resulting performance measurements, and their associated native code compilation iteration, is then stored in memory by the native code management module in step 318.

A determination is then made in step 320 whether all available compiler parameter permutations have been compiled by the JIT compiler. If not, the process continues, proceeding with step 312. Otherwise, the native code management module performs comparison operations in step 322 on the performance measurements stored in memory to determine the best performing native code compilation iteration. The native code management module then selects the best performing native code compilation iteration in step 324 for execution. In one embodiment, the native code management module discards the other native code compilation iterations. In another embodiment, the other native code compilation iterations are retained in memory for use if the selected native code compilation iteration fails or causes a processing problem.

The selected native code compilation iteration is then executed in step 326. A determination is then made in step 328 whether the selected native code compilation iteration has failed or caused a processing problem. If not, the process is continued, proceeding with step 326. If so, then a determination is made in step 330 whether to try a different native code compilation iteration. If so, then the process continues, proceeding with step 324 where the native code management module selects a different native code compilation iteration. Otherwise, the optimization of Java compilation operations is ended in step 332.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for improving the performance of compiled Java code, comprising:
    an information processing system including one or more processors;
    a native code management module executing on the information processing system, the native code management module operable to:
        identify the one or more processors associated with the information processing system;
        determine an instruction set architecture (ISA) associated with individual processors of the plurality of processors;
        generate a plurality of compiler parameter permutations, each permutation relating to a combination of information about the one or more processors, the ISA of the one or more processors, and at least one of a plurality of native code compilation optimization operations relating to the one or more processors and the ISAs, wherein the plurality of native code compilation optimization operations includes: code vectorization operations, Instruction Based Sampling operations, or Lightweight Profiling (LWP) operations;
        provide the compiler parameter permutations to a just-in-time compiler operable to iteratively use the compiler parameter permutations to compile predetermined Java bytecode into a plurality of native code iterations, each native code iteration corresponding to a respective permutation;
        measure the performance of each native code iteration to generate performance measurements;
        perform comparison operations on the performance measurements to select a best performing native code iteration from among the plurality of native code iterations; and
        execute the selected native code iteration.

2. The system of claim 1, wherein the one or more processors includes at least one central processor of a central processing unit.

3. The system of claim 1, wherein the one or more processors includes at least one graphics processor of a graphics processing unit.

4. A method for improving the performance of compiled Java code, comprising:
    using a native code management module to:
        identify one or more processors associated with an information processing system;
        determine an instruction set architecture (ISA) associated with each of the one or more processors;
        generate a plurality of compiler parameter permutations, each permutation relating to a combination of information about the one or more processors, the ISA of the one or more processors, and at least one of a plurality of native code compilation optimization operations relating to the one or more processors and the ISAs, wherein the plurality of native code compilation optimization operations includes: code vectorization operations, Instruction Based Sampling operations, or Lightweight Profiling (LWP) operations;

provide the compiler parameter permutations to a just-in-time compiler operable to iteratively use the compiler parameter permutations to compile predetermined Java bytecode into a plurality of native code iterations, each native code iteration corresponding to a respective permutation;

measure the performance of each native code iteration to generate performance measurements;

perform comparison operations on the performance measurements to select a best performing native code iteration from among the plurality of native code iterations; and execute the selected native code iteration.

5. The method of claim 4, wherein the one or more processors includes at least one central processor of a central processing unit.

6. The method of claim 4, wherein the one or more processors includes at least one graphics processor of a graphics processing unit.

* * * * *